United States Patent

Rudys et al.

[11] Patent Number: 5,820,196
[45] Date of Patent: Oct. 13, 1998

[54] VEHICLE TRANSPORT COVER

[75] Inventors: Stasys K. Rudys; David Charles Jones, both of Midlothian, Va.; Virginia McAndrews Walsh, East Norriton, Pa.; Douglas John Nattrass, Lansdale, Pa.; Charles Benjamin Simon, Gwynedd Valley, Pa.

[73] Assignee: E. I. du Pont de Nemours and Company, Wilmington, Del.

[21] Appl. No.: 561,764

[22] Filed: Nov. 22, 1995

[51] Int. Cl.⁶ ...................................................... B06J 11/00
[52] U.S. Cl. ............................................. 296/136; 150/166
[58] Field of Search .................................. 296/136, 95.1; 150/166; 280/770; 135/159

[56] References Cited

U.S. PATENT DOCUMENTS

| | | | |
|---|---|---|---|
| 2,065,242 | 12/1936 | Omerly, Jr. | 160/370.21 |
| 3,169,899 | 2/1965 | Steuber | 428/198 |
| 3,653,497 | 4/1972 | Hornstein | 206/335 |
| 3,763,908 | 10/1973 | Norman | 150/166 |
| 4,589,459 | 5/1986 | Lantrip | 296/136 X |
| 4,635,996 | 1/1987 | Hirose | 296/136 |
| 5,029,933 | 7/1991 | Gillem | 296/136 |
| 5,042,836 | 8/1991 | Swanson | 150/166 X |
| 5,275,460 | 1/1994 | Kraus | 296/136 |

FOREIGN PATENT DOCUMENTS 2543891  10/1984  France ..................................... 296/136

OTHER PUBLICATIONS

Shift, 3M Automotive, p. 9, "Just What the Doctor Ordered" Issue 1, 1995 (published Feb. 1995).

*Primary Examiner*—Andrew C. Pike

[57] ABSTRACT

A motor vehicle transport cover is made of a vapor permeable, water impermeable, synthetic nonwoven sheet. The transport cover is includes a mechanism for firmly attaching the nonwoven sheet in a position on a motor vehicle that covers substantially all of the roof, hood, and front bumper fascia of the vehicle and remains attached at air speeds along the major axis of the vehicle of at least 50 mph. The attachment mechanism is readily releasable and it leaves no visible adhesive residue on the vehicle at the moment the nonwoven sheet is removed from the vehicle. The transport cover does not significantly inhibit access to the covered vehicle and it does not obstruct the view of a driver of the covered vehicle. The transport cover has a front sheet piece made to cover the hood of the covered vehicle and a top sheet piece made to cover the roof of the covered vehicle. Where the covered vehicle is a sedan, the transport cover may also cover the trunk and rear bumper of the vehicle.

16 Claims, 3 Drawing Sheets

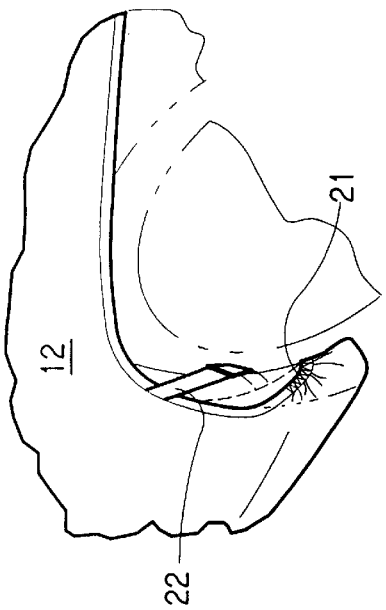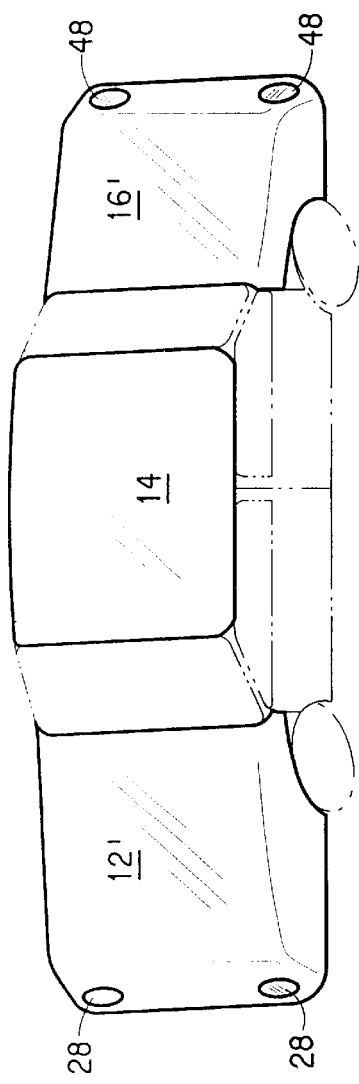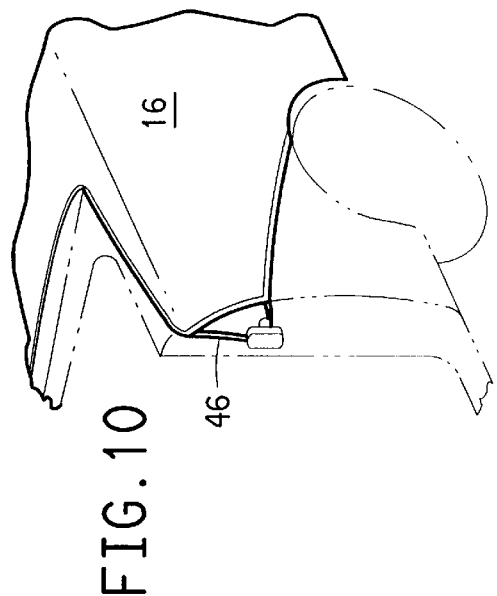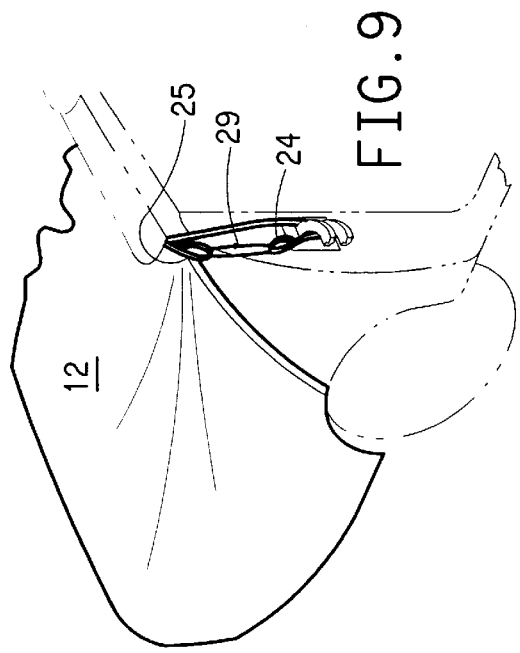

VEHICLE TRANSPORT COVER

FIELD OF THE INVENTION

This invention relates to automotive vehicle covers and more particularly to covers for protecting automotive vehicles during transport from the factory to automotive dealerships and other destinations.

BACKGROUND OF THE INVENTION

After manufacture, automobiles, trucks, and other vehicles are conventionally transported from the factory to automotive dealerships and other destinations for sale or leasing to consumers. The journey from the factory typically entails transport of the vehicle by some combination of truck, train, and boat. During transport, the exterior finish of the new vehicles can be damaged by acid rain, by flying road debris such as sand, stones, and asphalt, or by flying iron filings emitted from the brakes of vehicle transport trains. The value of a vehicle with a marred exterior finish may be substantially reduced and it may be difficult to sell such a vehicle without first undertaking extensive refinishing.

Traditional one piece vehicle storage covers cannot be used as transport covers because such storage covers do not stay firmly attached when subjected to air movement experienced during transit which can thereby create serious highway safety hazards. Traditional storage covers also obstruct access to the vehicle to which the covers are applied and they obscure the view of the drivers that must periodically drive vehicles on and off trucks, trains, and boats as the vehicles are transported from factory to dealership.

Vehicle manufacturers have used a variety of strategies to reduce damage to the exterior of vehicles during transport. Vehicles have been coated with waxes or resins for transport, but the removal of such coatings is time consuming and results in the generation of substantial amounts of waste. Another protective strategy has been to coat portions of vehicles with disposable protective covers. Known vehicle transport covers typically comprise sheets of film, paper, or fabric adhered to a vehicle by a wax or adhesive. While such vehicle transport covers have been found to provide some protection to vehicle exteriors, these existing transport covers also suffer from a variety of drawbacks. Existing vehicle transport covers are difficult for assembly line workers to quickly install on vehicles coming off the line. At the time of removal, many known covers require the use of hazardous or environmentally troublesome solvents to dissolve the wax or adhesive that holds the cover on the vehicle. Moisture also builds up under many known vehicle covers where it can mar vehicle exteriors. Likewise, solvents that off-gas from plastics and paints applied to vehicles can damage the vehicle exteriors when trapped under known vehicle transport covers. Finally, existing covers are not reusable and cannot easily be recycled, thus creating disposal problems for vehicle dealerships and for the municipalities in which the dealerships are located.

SUMMARY OF THE INVENTION

Accordingly, it is an object of the invention to provide a vehicle transport cover that is reusable, is recyclable, and is also strong and durable enough to survive multiple trips from assembly line to dealership.

It is also an object of the invention to provide a vehicle transport cover that protects a vehicle against exterior surface damage during transport, but does not trap moisture or off-gassing solvents between the cover and the vehicle exterior.

Finally, it is an object of the invention to provide a vehicle transport cover that can quickly and surely be attached to a vehicle by just two people and that can also quickly and easily be removed from the vehicle at a dealership without resort to potentially harmful solvents.

The foregoing objects of the invention are achieved by the vehicle transport cover as embodied and broadly described herein. The reusable motor vehicle transport cover provided comprises a synthetic nonwoven sheet having a water vapor transmission rate of at least 100 g/m$^2$ in 24 hours according to ASTM standard E96, method B, having a liquid water permeability resistance expressed by a hydrostatic head pressure of at least 1 m according to AATCC standard 127, and having an Elmendorf tear strength of at least 12 Newtons. Attachment means is provided for firmly attaching the synthetic nonwoven sheet in a position on a motor vehicle that covers substantially all of the roof, hood, and front bumper of the vehicle and remains attached at air movement speeds of at least 50 mph along the major axis of the vehicle. The attachment means leaves no visible residue on the vehicle at the time the nonwoven sheet is removed from the vehicle. In addition, the attachment means for the vehicle transport cover can be manipulated to readily release the nonwoven sheet from the motor vehicle in a manner that permits substantial portions of the nonwoven sheet to be used as a vehicle transport cover more than one time. The reusable motor vehicle transport cover preferably comprises a nonwoven sheet comprised of front, top, and rear separate sheet pieces. The front sheet piece substantially covers the hood and front bumper of a vehicle to which the sheet is attached. The top sheet piece substantially covers the roof of a vehicle to which the sheet is attached. The rear sheet piece substantially covers the trunk lid and rear bumper of a vehicle to which the sheet is attached.

BRIEF DESCRIPTION OF THE DRAWINGS

The accompanying drawings, which are incorporated in and constitute a part of this specification, illustrate the presently preferred embodiments of the invention and, together with the description, serve to explain the principles of the invention.

FIG. 7 is a perspective view of an embodiment of the present invention in which transparent or translucent panels cover the headlights, taillights, and back-up lights of a vehicle to which the vehicle transport cover of the invention is applied.

FIG. 8 is a detailed perspective view of one of the straps of the front sheet piece of the vehicle transport cover identified by the detail 8 shown in FIG 2, shown secured to a motor vehicle.

FIG. 9 is a detailed perspective view of one of the straps on the rear edge of the front sheet piece of the vehicle transport cover identifies by the detail line 9 shown in FIG. 2, shown attached to a vehicle's front door hinge.

FIG. 10 is a detailed perspective view of one of the loops on the front edge of the rear sheet piece of the vehicle transport cover identified by the detail line 10 shown in FIG. 2, shown hooked over a vehicle's rear door locking post.

DETAILED DESCRIPTION OF THE PREFERRED EMBODIMENT

Figure 1:
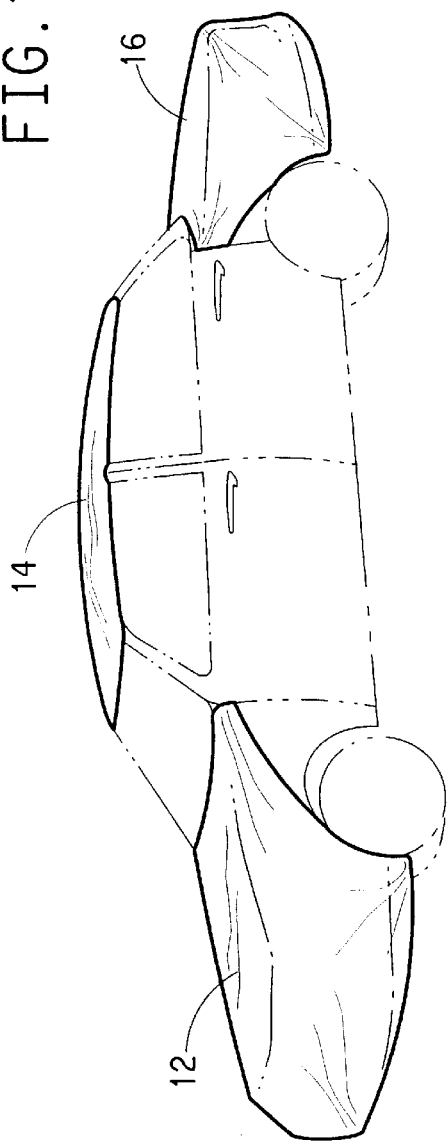
FIG. 1 shows an automobile to which a preferred embodiment of the vehicle transport cover of the present invention is attached.

Reference will now be made in detail to the presently preferred embodiments of the invention, examples of which are illustrated in the accompanying drawings. Throughout the drawings, like reference characters are used to designate like elements.

FIG. 1 shows an automobile to which the motor vehicle transport cover of the present invention has been applied. According to the invention, a nonwoven sheet is attached to a vehicle in a manner that covers the portions of a vehicle exterior that are most vulnerable to transport damage, namely the vehicle's front bumper, the grill, the hood, and the roof. In the embodiment of the invention shown in FIG. 1, the nonwoven sheet is divided into separate sheet pieces. A front sheet piece 12 covers the hood, front bumper fascia, and grill of a vehicle to which the transport cover is attached. A top sheet piece 14 covers the roof of a vehicle to which the cover is attached. For sedan-type vehicles, a rear sheet piece 16 can be applied over the trunk and rear bumper of the vehicle to which the transport cover is attached.

According to the invention, the sheet material of the vehicle transport cover is comprised of a synthetic non-woven material. The sheet material should be vapor-permeable (ie., the sheet should have a water vapor transmission rate of at least 100 $g/m^2$ in 24 hours according to ASTM standard E96, method B). The sheet material should also be liquid-water-impermeable (ie., the sheet should have a liquid water permeability resistance expressed by a hydrostatic head pressure of at least 1 m according to AATCC standard 127). It is also important that the sheet have a tear strength of at least 12 Newtons according to the Elmendorf Tear Strength test. Finally, it is preferred that the sheet material not be abrasive to a vehicle exterior and that the sheet material be launderable at least five times.

Elmendorf tear strength is a measure of the force required to propagate a tear cut in a sheet. The average force required to continue a tongue-type tear in a sheet is determined by measuring the work done in generating a tear in the sheet of a fixed distance. The tear tester consists of a sector-shaped pendulum carrying a clamp that is in alignment with a fixed clamp when the pendulum is in the raised starting position, with maximum potential energy. A sheet specimen is fastened in the clamps and a tear is started by a slit cut in the specimen between the clamps. The pendulum is released and the specimen is torn as the moving clamp moves away from the fixed clamp. Elmendorf tear strength is measured in accordance with the following standard methods: TAPPI-T-414 om-88 and ASTM D 1424.

Particularly well suited to the invention are sheets of spunbonded nonwoven polyolefin film-fibrils of the type disclosed in U.S. Pat. No. 3,169,899 or vapor-permeable fabric sheets of the type disclosed in U.S. Pat. No. 4,684,568, the contents of which are both incorporated by reference herein. Polyethylene and polypropylene are the polyolefins of choice. A commercial spunbonded nonwoven polyethylene film-fibril sheet product that is particularly suitable to the vehicle transport cover of the invention is TYVEK® spunbonded polyolefin sheet sold by E. I. du Pont de Nemours and Company of Wilmington, Del. TYVEK® is a registered trademark of DuPont. TYVEK® spunbonded polyolefin sheets are lightweight and have outstanding mechanical properties while also having good tolerance to ordinary weather conditions.

A particularly preferred sheet product for use in the invention is TYVEK® 1461-L sheet, due to its advantageous moisture vapor transmission rate which has been measured using ASTM E-96, Method B to be between 600 and 1100 $g/m^2$ in 24 hrs. TYVEK® 1461-L sheet has a liquid water permeability resistance expressed by a hydrostatic head pressure of 1.6 m according to AATCC standard 127. TYVEK® 1461-L sheet has a thickness of between 0.1 and 0.25 mm and a basis weight of about 59 $gr/m^2$. The Elmendorf tear strength for TYVEK® 1461-L sheet is between 13.8 and 15.1 Newtons. TYVEK® 1461-L is made of high density polyethylene, making it readily recyclable. In addition, TYVEK® 1461-L sheet can be readily printed with advertising or other information and it can also be laundered repeatedly.

Figure 2:
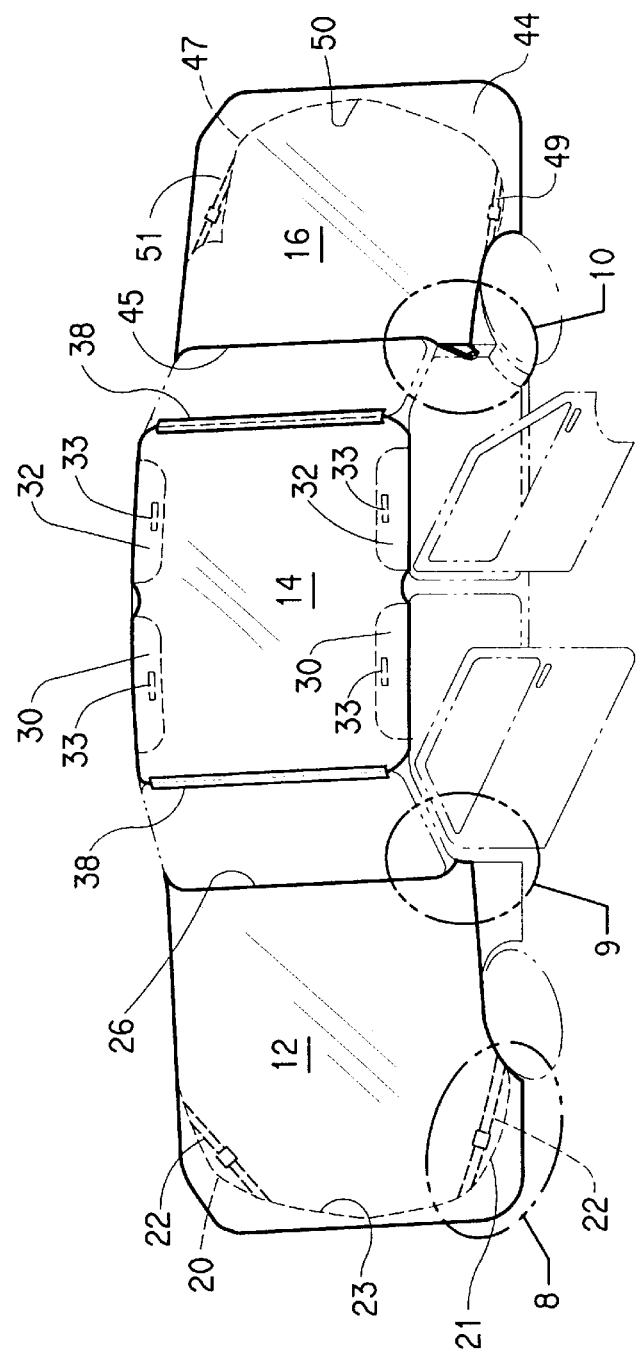
FIG. 2 is a perspective view of the vehicle transport cover of the present invention shown as it would be attached to a motor vehicle.

FIG. 2 shows the vehicle transport cover as it would be applied to an automobile sedan. Front sheet piece 12 is cut and assembled such that the piece can be snugly attached over a vehicle's hood and front bumper fascia without the use of adhesives. In order to attach the front sheet piece 12 to a vehicle, the front portion of sheet piece 12 is pulled over the vehicle's front bumper. The front portion of front sheet piece 12 is cut and seamed such that it fits over and conforms to the contours of the vehicle's hood and front bumper fascia. The front edge of front sheet piece 12 may be held in place under the front bumper fascia by elastic attached along the sheet edge. Once the front portion of front sheet piece 12 is pulled over the bumper of the vehicle to which the transport cover is being applied, the rear edge 26 of the front sheet piece is attached to the vehicle along the edge of the hood that abuts the vehicle's windshield. In the preferred embodiment of the invention shown in FIGS. 2 and 3, two straps 24 extend from opposite ends of the reinforced rear edge 26 of front sheet piece 12 and are attachable to the front door hinges on opposite sides of the vehicle. Straps 24 may be designed to hook or tie directly to the door hinges, or they may go around the door hinges and attach to a second strap or loop 25 extending from the edge of front sheet piece 12. This attachment may be by means of hooks, snaps, clips, ties, or VELCRO® releasable hook and loop fastening strips. VELCRO® is a registered trademark of Velcro U.S.A., Inc. In the embodiment of the invention shown in FIGS. 3 and 9, each loop on the end of the straps 24 is designed to be threaded around the top front door hinge of a vehicle to which the transport cover is applied and then attached to a corresponding loop 25 by means of a self-locking nylon or polypropylene tie or a plastic cable lock 29.

Figure 3:
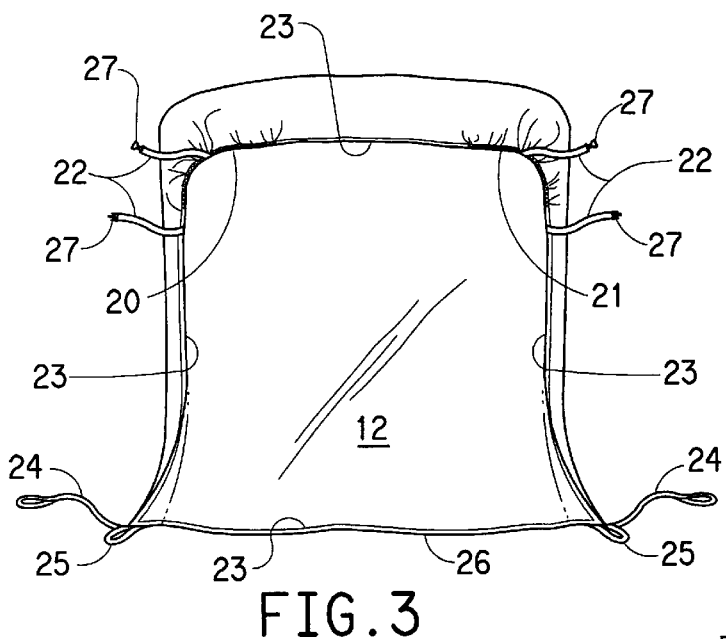
FIG. 3 is a plan view of the underside of the front sheet piece of the vehicle transport cover shown in FIG. 2.

According to the preferred embodiment of the invention shown in FIG. 3, elastic cord sections 20 and 21 are attached along the opposite corners of the front edge of front sheet piece 12. As shown in FIG. 3, elastic cord sections 20 and 21 may be sewn into the front edge of the front sheet piece. Lengths of inelastic reinforcing cord 23 are preferably sewn into the center section of the front edge of front sheet piece 12 between the elastic cord sections 20 and 21 and into the other nonelastic edges of front sheet piece 12. If the bottom edge of the front bumper fascia of the vehicle to which the cover is attached has a lip or a sharply angled contour, snug fitting elastic bands 20 and 21 may be sufficient to hold front sheet piece 12 in place on a vehicle. Otherwise it may be necessary to attach the front sheet piece 12 to the underside of the vehicle front bumper fascia by hooks, straps, snaps, or latches that attach the front edge of the front sheet piece to the vehicle frame, by pairs of elastic or nonelastic locking straps attached to the edge of front sheet piece 12, by separate straps that wrap around the front end of the vehicle to which the cover is attached, or by some combination thereof. Preferably, such attachments are readily releasable and reattachable to permit access under the hood of a vehicle to which the transport cover is attached.

In the preferred embodiment of the invention shown in FIGS. 2, 3, and 8, locking straps pairs 22 are provided for securely fastening the front sheet piece 12 on a vehicle. The straps of strap pairs 22 may be either elastic or nonelastic bands. The straps of strap pairs 22 each have locking clasps 27 at their ends such that the free ends of the straps of each strap pair can be releasably locked to the other strap of the pair. As best seen in FIGS. 2 and 8, the strap pairs 22 can be attached under the opposite front wheel wells and front corners of the front bumper fascia of a vehicle to which the transport cover is attached. The nonextendible reinforcing cord 23 sewn into the center of the front edge of front sheet piece 12 helps secure the front edge of front sheet piece 12 under the bumper fascia when the strap pairs 22 are locked. When so secured, blowing air does not get under the front sheet piece and pull the sheet off. Strap pairs 22 may, in an alternative embodiment of the invention, be replaced with lengths of elastic cord attached to the front sheet piece 12 at substantially the same attachment points as shown for the straps of strap pairs 22 in FIGS. 3 and 8. In another alternative embodiment of the invention, an additional pair of locking straps could be secured to the center of the front edge of front sheet piece 12 between the pairs of locking straps 22 to help secure the front edge of front sheet piece 12. With the attachment mechanisms described above, front sheet piece 12 may be releasably secured over the hood and front bumper fascia of a vehicle without the use of adhesives such that front sheet piece 12 can be used repeatedly. In addition, the absence of adhesive on the sheet material makes the front sheet piece more easily recyclable at the end of the piece's useful life.

Figure 4:
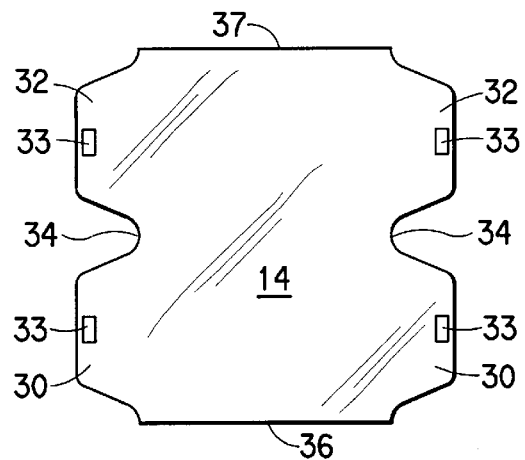
FIG. 4 is a plan view of the underside of the top sheet piece of the vehicle transport cover shown in FIG. 2.

The top sheet piece 14 is best shown in FIGS. 2 and 4. As can be seen in FIG. 4, top sheet piece 14 comprises a flat sheet of the nonwoven material of the type described above. Top sheet piece 14 is cut with a front edge 36, a rear edge 37, and sets of opposite side flaps 30, 32 corresponding to the number of doors on each side of the vehicle. Front edge 36 of top sheet piece 14 extends to at least the top edge of the windshield of a vehicle to which the vehicle transport cover of the invention is attached. As best seen in FIG. 2, side flaps 30 and 32 fold inside the vehicle's doors and are attached to the inside roof of the vehicle to which the cover is attached by tape strips, hooks or VELCRO® releasable hook and loop fastening strips 33. The side cutout portions 34 correspond to the roof support post between the front and rear doors of a vehicle to which the vehicle transport cover is attached. The strips 33 hold the top sheet piece out of the way of drivers or other persons who must get in and out of the vehicle to which the cover is attached. Upon closing the side doors or the vehicle to which the transport cover is attached, the top sheet piece 14 is locked firmly in place on the vehicle's roof. When the top sheet piece is to be attached to a vehicle with just one swinging side door on each side, as for example, with a hatchback, pickup truck, or van, then the top sheet piece is made with just one side flap 32 on each of its sides.

A strip of adhesive tape 38 is used to attach the front edge 36 of top sheet piece 14 to the top of the windshield of the vehicle to which the vehicle transport cover of the invention is applied. In order for the adhesive to hold top sheet piece 14 in place, it is important that the sheet piece be made from a material with a high delamination strength. Preferably, top sheet piece 14 has a delamination strength of at least 0.3 N/25 mm. Delamination of a sheet sample is measured using a constant rate of extension tensile testing machine such as an Instron table model tester. A 1.0 in. (2.54 cm) by 8.0 in. (20.32 cm) sample is delaminated approximately 1.25 in. (3.18 cm) by inserting a pick into the cross-section of the sample to initiate a separation and delamination by hand. The delaminated sample faces are mounted in the clamps of the tester which are set 1.0 in. (2.54 cm) apart. The tester is started and run at a cross-head speed of 5.0 in./min. (5.08 cm/min.). The computer starts picking up readings after the slack is removed after about 0.5 in. of crosshead travel. The sample is delaminated for about 6 in. (15.24 cm) during which 3000 readings are taken and averaged. The average delamination strength is given in lbs./in. (N/mm). The test generally follows the method of ASTM D 2724-87.

According to the invention, the front edge 36 of top sheet piece 14 is taped to the windshield of the vehicle to which the cover is applied in a manner that prevents wind from getting under the top sheet piece. A second strip of tape 38 may be applied to rear edge 37 of top sheet piece 14 and to the rear window of a vehicle to which the car transport cover of the invention is attached. When the vehicle transport cover is to be applied to vehicles without trunks or to vehicles with just one side swinging door on each side, such as utility vehicles, vans, hatchbacks, or station wagons, it may be especially important to tape the rear edge of top sheet piece 14 to the rear window of the vehicle. In one embodiment of the invention, the front edge 36 and rear edge 37 of sheet piece 14 can be configured so as to extend as much as one third of the way down the windshield and rear window of a vehicle to which the vehicle transport cover is applied. This extra length permits the portions of the top sheet piece to which adhesive tape has been applied to be cut off upon removal of the sheet piece while leaving enough of the top sheet piece 14 to permit one or more reuses.

The adhesive tape strip 38 used to secure the top sheet piece 14 to the glass of the vehicle to which the vehicle cover is to be applied may be a single- or double sided tape. The adhesive that sticks to the vehicle glass should peel cleanly from the vehicle glass without leaving any visible residue. The tape must also be stable over the full range of temperatures to which a vehicle in transport might be exposed (−40° C. to 65° C.). Finally, in order to reduce adhesive breakdown, the tape should be substantially opaque to UV radiation.

According to the preferred embodiment of the invention, the adhesive tape used to attach the top sheet piece to a vehicle is a single sided tape having one band coated with an aggressive pressure sensitive permanent adhesive that adheres well to a nonwoven surface and another band coated with a less aggressive removable adhesive. The aggressive adhesive band attaches to the edge of the top sheet piece 14 and the less aggressive adhesive band attaches to the vehicle glass. The aggressive band of adhesive should have a peel strength on top sheet piece 14 that is at least 10 N/25 mm. The peel strength of the less aggressive adhesive on glass should be sufficient to withstand anticipated wind forces, i.e., at least 7 N/25 mm.

Peel strength of the adhesives on glass is measured according to standard method PSTC-1 of the Pressure Sensitive Tape Council. Further to this method, the peel strength on a substrate is measured by first mounting the pressure sensitive adhesive tape on a substrate panel. One end of a sample of the pressure sensitive adhesive tape, 1 inch×12 inches (2.54×30.5 cm), is touched to the panel. A 4.5 lb (2.05 kg) roller is used to apply the tape to the panel, rolling once in each lengthwise direction. The sample is tested immediately, within one minute of preparation. The peel strength is measured using a constant rate of extension tensile machine such as an Instron table model tester. The free end of the tape which was held during rolling is doubled back at an angle of 180 degrees and 1 inch of the tape is peeled by hand from the panel. The end of the panel, corresponding to the end where the peel has been initiated, is mounted in the bottom clamp and the free end is mounted in the top clamp. The tester is started and run at a cross-head speed of 12 inches (30 cm) per minute cross-head speed. The pull values obtained while peeling the first inch of the tape from the panel are disregarded and the pull values obtained while peeling the next 2 inches are averaged to give the adhesion peel strength. The peel strength is reported in N/mm. A modification of method PSTC-1 is used to measure the peel strength of a tape adhered to a nonwoven surface. A 0 degree shear peel strength from a nonwoven surface was measured because the 180 degrees test results in delamination of the nonwoven substrate. According to the modified test, one end of a 1 inch×8 inches (2.54×20.3 cm) piece of pressure sensitive adhesive tape is adhered to a 1 inch×1 inches (2.54×20.3 cm) strip of the nonwoven material such that 2 inches of the adhesive tape overlaps the nonwoven strip. A 4.5 lb (2.05 kg) roller is rolled over the 2 inch overlapped area once in each direction. The ends of the strip are placed in opposing jaws of an Instron tester such that about 6 inches of the strip including the 2 inch overlap, are between the jaws which are set 6 inches apart. The test then proceeds as in the Delamination test described above. The maximum stress before failure is taken as the 0 degree shear peel strength of the tape. If the failure is outside of the 1 inch overlap area the result is noted as a tensile break of the nonwoven material or the tape. The strength is reported in N/25 mm.

Figure 6:
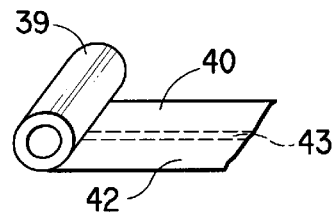
FIG. 6 is a perspective view of the adhesive tape used with the top sheet piece of the vehicle transport cover shown in FIG. 4.

As shown in FIG. 6, a tape roll 39 may be provided with a band of aggressive permanent adhesive 40 and a band of less aggressive removable adhesive 42 that is separated from the aggressive adhesive by a clear band 43 coated with no adhesive. The adhesive-free band makes it possible to use the adhesive tape to quickly secure top sheet piece 14 to vehicle roofs. The less aggressive adhesive may be an adhesive that remains tacky after use such that the top sheet piece 14 can be easily repositioned on vehicle and can be reused on subsequent vehicles without requiring new tape. One such double-banded tape is Type CA-867 tape sold by Specialty Tapes of Racine, Wis. It has also been found that a double sided tape with a permanent pressure sensitive adhesive on one side for adhering to the top sheet piece and a less aggressive adhesive on the opposite side for attaching to the vehicle glass can be advantageously used to apply the top sheet piece 14 of the vehicle transport cover of the present invention to a vehicle. One such double sided tape is Type 8300 tape sold by Fasson Specialty Tape Division of Avery Dennison Corporation of Painesville, Ohio. When a double sided tape is used, the delamination strength of the sheet 14 should be at least 0.6 N/25 mm.

Figure 5:
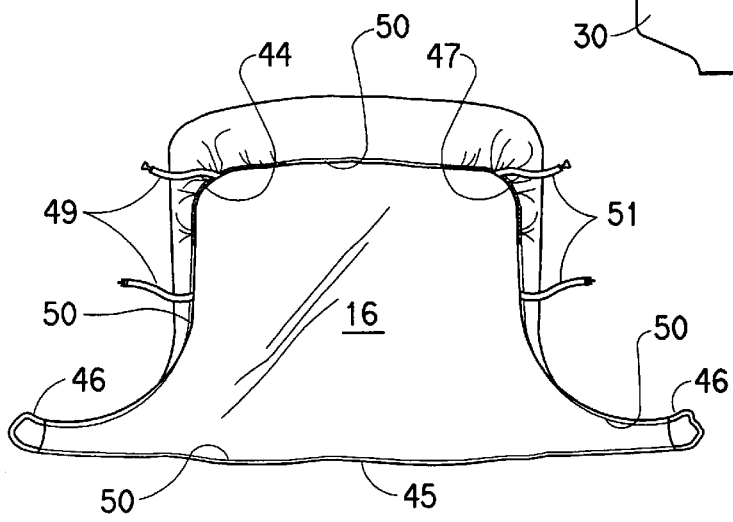
FIG. 5 is a plan view of the underside of the rear sheet piece of the vehicle transport cover shown in FIG. 2.

When the vehicle transport cover of the invention is applied to a vehicle with a trunk, as shown in FIG. 2, a rear sheet piece 16, assembled such that the piece can be snugly attached over a vehicle's trunk lid and rear bumper without the use of adhesives, may be attached to the vehicle. Preferably, rear sheet piece 16 is made from the nonwoven sheet material described above. In order to attach the rear sheet piece 16 to a vehicle, the rear portion of the sheet piece 16 is pulled over the vehicle's rear bumper. The rear portion of sheet piece 16 is cut and seamed such that it fits over and conforms to the contours of the vehicle's rear bumper. Once the rear portion of rear piece 16 is pulled over the bumper of a vehicle to which the transport cover is being applied, the front edge 45 of the rear sheet piece 16 is attached to the vehicle along the edge of the trunk lid that abuts the vehicle's rear window. In the preferred embodiment of the invention shown in FIGS. 2 and 5, two loops 46 extend from opposite ends of the reinforced front edge 45 of rear sheet piece 16 and are attachable around rear door locking posts on opposite sides of the vehicle. Alternatively, loops 46 could be replaced with straps, hooks, clips, ties, VELCRO® releasable hook and loop fastening strips.

The rear edge of the rear sheet piece 16 may be held in place under the rear bumper by elastic attached along the sheet edge, by hooks, straps, or latches that attach to the vehicle frame, by pairs of elastic or nonelastic locking straps attached to the edge of rear sheet piece 16, by separate straps that wrap around the rear end of the vehicle to which the cover is attached, or by some combination thereof. According to the preferred embodiment of the invention shown in FIG. 5, elastic cord sections 44 and 47 are attached to the rear edge of rear sheet piece 16. Elastic cord sections 44 and 47 may be lengths of elasticized cord sewn into the rear edge of the rear sheet piece. A length of nonelastic reinforcing cord 50 is preferably sewn into the center of the rear edge of rear sheet piece 16 between the elasticized cord sections 44 and 47 and into the remaining edges of the rear sheet piece.

If the bottom edge of the rear bumper of the vehicle to which the cover is attached has a lip or sharply angled contour, snug fitting elastic bands 44 and 47 may be sufficient to hold the rear sheet piece in place on the vehicle. Otherwise, it may be necessary to hook, strap, or snap the rear edge of rear sheet piece 16 to the underside of the rear bumper. Preferably, such attachments are readily releasable and reattachable to permit access to the trunk of a vehicle to which the transport cover is attached during transport of the vehicle. In the preferred embodiment of the invention shown in FIGS. 2 and 5, pairs of locking straps 49 and 51 are provided for securely fastening the rear sheet piece 16 on a vehicle. Straps of strap pairs 49 and 51 may be either elastic or nonelastic bands. The straps of strap pairs 49 and 51 each have locking clasps at their ends such that the free ends of the straps of each strap pair can be releasably locked to the other strap of the pair. In an alternative embodiment of the invention, an additional pair of locking straps could be secured to the center of the rear edge of rear sheet piece 16 between the pairs of locking straps 49 and 51 to help secure the rear edge of sheet piece 16 to a vehicle.

As can be seen in FIG. 2, the strap pairs 49 and 51 can be attached under the opposite rear wheel wells and rear corners of the rear bumper of a vehicle to which the transport cover of the invention is attached in a manner similar to that shown in FIG. 8. When so secured, blowing air does not get under the rear sheet piece and pull the piece off. Strap pairs 49 and 51 may, in an alternative embodiment of the invention, be replaced with lengths of elastic cord attached to the rear sheet piece 16 at substantially the same attachment points shown for the straps of strap pairs 49 and 51 in FIG. 5. With the attachment mechanisms described above, rear sheet piece 16 may be releasably secured over the trunk lid and rear bumper without the use of adhesives, and therefore, the rear sheet piece can be reused repeatedly. In addition, the absence of adhesive on the sheet material makes the rear sheet piece more easily recyclable at the end of its useful life.

In one embodiment of the invention, front sheet piece 12' and rear sheet piece 16' can be made with translucent panels arranged to correspond with the headlights, taillights, and back-up lights of a vehicle to which the vehicle transport cover of the present invention is attached. Such panels permit a vehicle to which the transport cover has been applied to be driven at night or in dark places without removing the cover. As shown in FIG. 7, transparent or translucent panels 28 in front sheet piece 12' permit the headlights of a vehicle under the vehicle transport cover of the invention to shine through the cover. Likewise, transparent or translucent panels 48 in rear sheet piece 16' permit the rear taillights and back-up lights to be seen through the vehicle transport cover of the present invention. The transparent panels may be portions of the sheet material that have been made transparent by heat treatment, or the panels may be sections of a transparent or translucent material that have been sewn into the cover, or have been heat or radio frequency welded into the cover. Preferably, the translucent panels are made by radio frequency welding a second layer of the same high density polyethylene that comprises the cover material over the portions of the cover where translucence is desired such that the cover material remains 100% highly recyclable high density polyethylene.

The vehicle transport cover of the present invention can be quickly and securely applied to a vehicle coming off an assembly line by just two people. In application trials, it was found that the three piece vehicle transport cover described above could be fully attached to a vehicle by two persons in less than 3.5 minutes. The transport cover protects those portions of a vehicle most susceptible to transport damage, including the front and rear bumpers. The vehicle transport cover of the invention also protects the vehicle against exterior fluids such as acid rain, while permitting the escape of water vapor or off-gassing solvents. The vehicle transport cover of the invention is formed and attached with releasable reinforcement straps such that wind is prevented from getting under the car cover in areas near the wheel wells and bumpers. The transport cover does not inhibit access to the vehicle and does not obstruct the view of a driver of the vehicle. In addition, the vehicle transport cover avoids any adhesive contact with the vehicle finish and leaves substantially no visible adhesive residue on a vehicle to which the cover has been applied. Finally, substantial portions of vehicle transport cover of the invention are both reusable and recyclable. It will be apparent to those skilled in the art that modifications and variations can be made in the motor vehicle transport cover of this invention. The invention in its broader aspects is, therefore, not limited to the specific details, and the representative apparatus described above. Thus, it is intended that all matter contained in the foregoing description and drawings shall be interpreted as illustrative and not in a limiting sense.

We claim:

1. A motor vehicle transport cover for covering a vehicle having a hood, a front bumper, a windshield, and a roof, the transport cover comprising:

a reusable front sheet piece made of a synthetic nonwoven sheet material having a water vapor transmission rate of at least 100 g/m$^2$ in 24 hours according to ASTM standard E96, method B, having a liquid water permeability resistance expressed by a hydrostatic head pressure of at least 1 m according to AATCC standard 127, and having an Elmendorf tear strength of at least 12 N, said front sheet piece having front and rear edges and being made to cover substantially all of the hood and the front bumper of the vehicle to which the front sheet piece is attached;

at least two releasable straps extending from opposite ends of the rear edge of the front sheet piece, the rear edge being positionable substantially contiguous with an edge of the covered vehicle's hood adjoining the vehicle's windshield when the front sheet piece is attached to the covered vehicle, the two releasable straps being oriented such that one of said releasable straps is attachable to a first side of the vehicle to which the front sheet piece is attached and another of said releasable straps is attachable to a second side of the vehicle to which the-front sheet piece is attached, said second side of the vehicle being opposite the first side of the vehicle;

at least one pair of front sheet piece locking straps each of which having first and second opposite ends, the first end of each locking strap of said at least one pair of front sheet piece locking straps being attached to the front sheet piece proximate the front edge of the front sheet piece, the second end of each of the straps of said at least one pair of front sheet locking straps being fastenable to each other by manually releasable locking clips, the front edge of the front sheet piece being securable under the vehicle's front bumper by fastening said locking clips of said at least one pair of front sheet piece locking straps; and a top sheet piece made of a synthetic nonwoven sheet material having a water vapor transmission rate of at least 100 g/m$^2$ in 24 hours according to ASTM standard E96, method B, having a liquid water permeability resistance expressed by a hydrostatic head pressure of at least 1 m according to AATCC standard 127, and having an Elmendorf tear strength of at least 12 N, said top sheet piece having means for firmly attaching said top sheet piece to the covered vehicle so as to cover substantially all of the roof of the vehicle to which the top sheet piece is secured.

2. The motor vehicle transport cover of claim 1 further comprising a reusable rear sheet piece made of a synthetic nonwoven sheet material having a water vapor transmission rate of at least 100 g/m$^2$ in 24 hours according to ASTM standard E96, method B, having a liquid water permeability resistance expressed by a hydrostatic head pressure of at least 1 m according to AATCC standard 127, and having an Elmendorf tear strength of at least 12 N, the rear sheet piece having opposite front and rear edges;

at least two rear strap loops extending from opposite ends of the front edge of the rear sheet piece, said front edge of said rear sheet piece being attachable to the vehicle, the vehicle further having a rear window, a trunk with a lid, and a rear bumper, by said two rear strap loops such that said front edge of the rear sheet piece is substantially contiguous with an edge of the vehicle's trunk lid adjoining the vehicle's rear window when the rear sheet piece is attached to the vehicle; and at least one pair of rear sheet piece locking straps each of which having first and second opposite ends, the first end of each locking strap of said at least one pair of rear sheet piece locking straps being attached to the rear sheet piece proximate the rear edge of the rear sheet piece, the second end of each of the rear sheet piece locking straps of said pair being fastenable to each other by manually releasable locking clips, said rear edge of the rear sheet piece being securable under the vehicle's rear bumper by fastening said locking clips of said at least one pair of rear sheet locking straps;

wherein said rear sheet piece is made to cover substantially all of the trunk lid and the rear bumper of the vehicle to which said front and rear edges of said rear sheet piece are attached.

3. The motor vehicle transport cover of claim 2 wherein said two strap loops, extending from the opposite ends of the front edge of the rear sheet piece, are oriented such that one of said strap loops fits over a door latch post on one side of the vehicle to which the rear sheet piece is attached and another of said strap loops fits over a door latch post on an opposite side of the vehicle to which the rear sheet piece is attached.

4. The motor vehicle transport cover of claim 2 wherein said rear edge of said rear sheet piece is securable under the covered vehicle's rear bumper by multiple pairs of said rear sheet piece locking straps, each pair of said rear sheet piece locking straps comprising first and second straps attached at first ends thereof at points proximate the rear edge of the rear sheet piece at a spacing of more than 6 inches from one another and having means at second ends thereof for releasably clipping the second ends thereof together.

5. The motor vehicle transport cover of claim 2 wherein said rear sheet piece has translucent panels oriented so as to cover taillights of the vehicle to which the rear sheet piece is attached.

6. The motor vehicle transport cover of claim 1 wherein said front edge of said front sheet piece is securable under the front bumper of the vehicle to which the front sheet piece is attached by multiple pairs of said front sheet piece locking straps, each pair of front sheet piece locking straps comprising first and second straps attached at first ends thereof at points proximate the front edge of the front sheet piece at a spacing of more than 6 inches from one another and having means at second ends thereof for releasably clipping the second ends thereof together.

7. The motor vehicle transport cover of claim 1 wherein said front sheet piece has translucent panels oriented so as to cover headlights of the vehicle to which the front sheet piece is attached.

8. The motor vehicle transport cover of claim 1 wherein the top sheet piece has opposite front and rear edges and opposite side edges, said front edge of the top sheet piece being positionable substantially contiguous with an edge of the vehicle's windshield adjoining the vehicle's roof when the top sheet piece is attached to the vehicle, said front edge of said top sheet piece being attachable to said windshield by adhesive tape, and the rear edge of the top sheet piece being extendible beyond an edge of the vehicle roof adjoining a rear window when the top sheet piece is attached to the vehicle, and the side edges of said top sheet piece each having at least one side flap that can be folded inside a corresponding vehicle door opening and releasably attached to an inside roof of the vehicle to which the top sheet piece is attached.

9. The motor vehicle transport cover of claim 8 wherein the adhesive tape is a single-sided adhesive tape with two bands of adhesive applied thereto, one of said adhesive bands being a high strength adhesive that attaches to the top sheet piece with an adhesive strength greater than 10 N/25 mm, and another of said bands being a lower strength adhesive that attaches to glass of the vehicle to which the top sheet piece is attached with an adhesive strength in a range of 6 to 10 N/25 mm.

10. The motor vehicle transport cover of claim 8 wherein the number of side flaps on each side of the top sheet piece corresponds to the number of swinging door openings on a respective said side of the vehicle to which the top sheet piece is applied, and wherein each of said side flaps has an attachment means for releasably attaching the side flap thereof to the inside roof of the vehicle to which the top sheet piece is attached.

11. The motor vehicle transport cover of claim 10 wherein said side flap attachment means comprises a strip of releasable hook and loop fastening material attached to each side flap of the top sheet piece.

12. A motor vehicle transport cover for covering a vehicle having a hood, a front bumper, a roof, a rear bumper, and a trunk with a lid, the transport cover comprising:

a synthetic nonwoven sheet having a water vapor transmission rate of at least 100 g/m$^2$ in 24 hours according to ASTM standard E96, method B, having a liquid water permeability resistance expressed by a hydrostatic head pressure of at least 1 m according to AATCC standard 127, and having a tensile strength of at least 12 N, said sheet comprising front, top, and rear separate sheet pieces, the front sheet piece being configured to cover the hood and the front bumper of the vehicle to which the sheet is attached, the top sheet piece being configured to cover the roof of the vehicle to which the top sheet piece is attached, and the rear sheet piece being configured to substantially cover the trunk lid and the rear bumper of the vehicle to which the rear sheet piece is attached; and attachment means for firmly attaching said synthetic nonwoven sheet in a position on the vehicle to which the transport cover is attached that covers substantially all of the front bumper, the hood, the roof, the trunk lid, and the rear bumper of the vehicle to which the transport cover is attached such that the nonwoven sheet remains attached to the vehicle at relative air movement speeds of at least 50 mph, said attachment means leaving no visible residue on the vehicle when the nonwoven sheet is removed from the vehicle, and said attachment means being manipulable to readily release said nonwoven sheet pieces from the covered vehicle in a manner that permits the nonwoven sheet to be used as a vehicle transport cover on multiple vehicles;

the front nonwoven sheet piece having opposite front and rear edges, said rear edge being positionable substantially contiguous with an edge of the vehicle hood adjoining a windshield of the vehicle to which the transport cover is attached when the front sheet piece is attached to the vehicle, and the front edge being securable under the front bumper of the vehicle when the front sheet piece is attached to the vehicle, said attachment means including at least two releasable straps extending from opposite ends of the rear edge of the front sheet piece for attaching the rear edge of said front sheet piece to the vehicle, and at least one pair of front sheet piece locking straps each of which having first and second opposite ends, the first end of each locking strap of said at least one pair of front sheet piece locking straps being attached to the front sheet piece along the front edge of the front sheet piece, the second end of each of the straps of said at least one pair of front sheet piece locking straps being fastenable to each other by manually releasable locking clips when the front sheet piece is to be secured to the vehicle;

the top sheet piece having opposite front and rear edges and opposite side edges, said front edge of the top sheet piece being positionable substantially contiguous with an edge of the vehicle windshield adjoining the vehicle roof when the top sheet piece is attached to the vehicle, said attachment means further including adhesive tape applicable to the front edge of said top sheet piece and to the vehicle windshield to which the top sheet piece is attached, the rear edge of said top sheet piece being extendible beyond an edge of the vehicle roof adjoining a rear window of the vehicle to which the transport cover is attached when the top sheet piece is attached to the vehicle, and the side edges of said top sheet piece each having at least one side flap that can be folded inside a corresponding vehicle door opening, the attachment means further including means for releasably attaching the side flaps on the top sheet piece to an inside roof of the vehicle to which the top sheet piece is attached; and the rear sheet piece having opposite front and rear edges, said front edge of said rear sheet piece being positionable substantially contiguous with an edge of the vehicle trunk lid that adjoins the rear window of the vehicle when the rear sheet piece is attached to the vehicle, and the rear edge of the rear sheet piece being securable under the rear bumper of the vehicle when the rear sheet piece is attached to the vehicle, said attachment means further including at least two strap loops extending from opposite ends of the front edge of the rear sheet piece for attaching to rear door latching posts on opposite sides of the vehicle to which the rear sheet piece is attached, and at least one pair of rear sheet piece locking straps each of which having first and second opposite ends, the first end of each locking strap of said at least one pair of rear sheet piece locking straps being attached to the rear edge of the rear sheet piece, the second end of each of the straps of said at least one pair of rear sheet locking straps being fastenable to each other by manually releasable locking clips when the rear sheet piece is to be secured to the vehicle.

13. The motor vehicle transport cover of claim 12 wherein said front edge of said front sheet piece is securable under the covered vehicle's front bumper by multiple pairs of said front sheet piece locking straps, each pair of front sheet piece locking straps comprising first and second straps attached at first ends thereof at points along the front edge of the first sheet piece at a spacing of more than 6 inches from one another and having means at the second ends thereof for releasably clipping the second ends thereof together.

14. The motor vehicle transport cover of claim 12 wherein the adhesive tape is a single-sided adhesive tape with two bands of adhesive applied thereto, one of said adhesive bands being a high strength adhesive that attaches to the top sheet piece with an adhesive strength greater than 10 N/25 mm, and another of said bands being a lower strength adhesive that attaches to glass of the vehicle to which the top sheet piece is attached with an adhesive strength in a range of 6 to 10 N/25 mm.

15. The motor vehicle transport cover of claim 12 wherein said side flap attachment means on the top sheet piece comprises a strip of releasable hook and loop fastening material attached to each side flap of the top sheet piece.

16. The motor vehicle transport cover of claim 12 wherein said rear edge of said rear sheet piece is securable under the covered vehicle's rear bumper by multiple pairs of said rear sheet piece locking straps, each pair of rear sheet piece locking straps comprising first and second straps attached at first ends thereof at points along the rear edge of the rear sheet piece at a spacing of more than 6 inches from one another and having means at second ends thereof for releasably clipping the second ends thereof together.

* * * * *